US009834706B2

(12) United States Patent
Yutou et al.

(10) Patent No.: US 9,834,706 B2
(45) Date of Patent: Dec. 5, 2017

(54) PRESSURE-SENSITIVE ADHESIVE TAPE

(71) Applicant: NITTO DENKO CORPORATION, Ibaraki-shi, Osaka (JP)

(72) Inventors: Takumi Yutou, Ibaraki (JP); Minoru Hanaoka, Ibaraki (JP)

(73) Assignee: NITTO DENKO CORPORATION, Ibaraki-shi, Osaka (JP)

( * ) Notice: Subject to any disclaimer, the term of this patent is extended or adjusted under 35 U.S.C. 154(b) by 346 days.

(21) Appl. No.: 14/629,681

(22) Filed: Feb. 24, 2015

(65) Prior Publication Data
US 2015/0259576 A1    Sep. 17, 2015

(30) Foreign Application Priority Data

Mar. 11, 2014 (JP) ................................. 2014-047524
Dec. 2, 2014 (JP) ................................. 2014-244011

(51) Int. Cl.
| | |
|---|---|
| *C09J 7/02* | (2006.01) |
| *C09J 133/08* | (2006.01) |
| *C08K 5/00* | (2006.01) |
| *C08K 5/12* | (2006.01) |

(52) U.S. Cl.
CPC ........... *C09J 7/0217* (2013.01); *C09J 7/0246* (2013.01); *C09J 7/0278* (2013.01); *C09J 133/08* (2013.01); *C08K 5/0016* (2013.01); *C08K 5/12* (2013.01); *C09J 2201/122* (2013.01); *C09J 2201/622* (2013.01); *C09J 2205/106* (2013.01); *C09J 2427/006* (2013.01); *C09J 2433/00* (2013.01); *Y10T 428/1452* (2015.01); *Y10T 428/28* (2015.01); *Y10T 428/2848* (2015.01); *Y10T 428/2891* (2015.01)

(58) Field of Classification Search
CPC .. C09J 2427/006; C09J 7/0217; C09J 7/0278; C09J 133/08; C09J 2201/122; C09J 2201/622; C08K 5/0016; C08K 5/12
See application file for complete search history.

(56) References Cited

U.S. PATENT DOCUMENTS

| | | | | |
|---|---|---|---|---|
| 4,533,698 A | * | 8/1985 | Maeda ................... | C08L 51/003 525/73 |
| 4,720,524 A | * | 1/1988 | Ohmae ................ | C08G 63/672 525/108 |
| 5,612,107 A | * | 3/1997 | Sangani .................... | B32B 7/12 428/352 |
| 5,861,211 A | * | 1/1999 | Thakkar .................... | B32B 7/12 156/273.3 |
| 6,630,049 B2 | * | 10/2003 | Hannington ........... | C09J 7/0203 156/230 |
| 8,084,534 B2 | * | 12/2011 | Gosse ....................... | C08K 5/12 524/285 |
| 8,372,912 B2 | * | 2/2013 | Olsen ....................... | C08K 5/12 524/100 |
| 9,309,183 B2 | * | 4/2016 | Storzum ................. | C07C 67/08 |
| 2003/0026932 A1 | * | 2/2003 | Johnson .................. | B32B 15/08 428/40.1 |
| 2007/0275201 A1 | | 11/2007 | Okawa | |
| 2011/0195250 A1 | | 8/2011 | Okawa | |
| 2014/0178620 A1 | | 6/2014 | Yutou et al. | |

FOREIGN PATENT DOCUMENTS

| | | |
|---|---|---|
| EP | 1 860 168 A2 | 11/2007 |
| JP | 63075050 A * | 4/1988 |
| JP | 2003253072 A * | 9/2003 |
| JP | 2007-314636 A | 12/2007 |
| JP | 2013-072068 A | 4/2013 |
| WO | 2013/129080 A1 | 9/2013 |

OTHER PUBLICATIONS

Small, "Some Factors Affecting the Solubility of Polymers", J. Appl. Chem. vol. 3, pp. 71-80 (1953).*
Anonymous: "DEHT—Polymer additives for plastic—Adeka Palmarole—Adeka Group", Jun. 29, 2012 (Jun. 29, 2013). XP055202456, Retrieved from the Internet: URL:https://web.archive.org/web/20130629024945/http://www.adeka-palmarole.com/additives-for-pvc/plasticisers/302-adeka-palmaroles-alternative-to-dop.html [retrieved on Jul. 15, 2015], 1 pg. total.
Extended European Search Report dated Aug. 5, 2015 issued by the European Patent Office in counterpart application No. 15157267.4.

* cited by examiner

*Primary Examiner* — Scott R Walshon
(74) *Attorney, Agent, or Firm* — Sughrue Mion, PLLC

(57) ABSTRACT

A pressure-sensitive adhesive tape that uses, as a plasticizer, an alternative compound to bis(2-ethylhexyl) phthalate (DOP) and dibutyl phthalate (DBP), having excellent tackiness, and can be unwound satisfactorily, where DOP and DBP are to be restricted under the REACH regulation. The pressure-sensitive adhesive tape includes a poly(vinyl chloride) substrate and a pressure-sensitive adhesive layer. The pressure-sensitive adhesive layer is disposed on or over one side of the substrate. The poly(vinyl chloride) substrate contains 10 to 40 percent by weight of bis(2-ethylhexyl) terephthalate. The pressure-sensitive adhesive tape preferably has an unwinding force of 0.4 N/20 mm or less at a tensile speed of 0.3 m/min and an unwinding force of 1.2 N/20 mm or less at a tensile speed of 30 m/min.

20 Claims, No Drawings

PRESSURE-SENSITIVE ADHESIVE TAPE

TECHNICAL FIELD

The present invention generally relates to pressure-sensitive adhesive tapes.

BACKGROUND ART

Highly-flexible pressure-sensitive adhesive tapes may be used typically as protective tapes upon processing of steel sheets or plates. As such highly-flexible pressure-sensitive adhesive tapes, Japanese Unexamined Patent Application Publication (JP-A) No. 2007-314636 (PTL 1) discloses a pressure-sensitive adhesive tape including a poly(vinyl chloride) film (PVC film) as a base material (substrate). The PVC film substrate contains bis(2-ethylhexyl)phthalate (DOP or DEHP) or dibutyl phthalate (DBP) as a plasticizer.

CITATION LIST

Patent Literature

PTL 1: Japanese Unexamined Patent Application Publication (JP-A) No. 2007-314636

SUMMARY OF INVENTION

Technical Problem

However, DOP and DBP are scheduled to be restricted under the Registration, Evaluation, Authorization and Restriction of Chemicals (REACH). The REACH is a regulation of the European Union (EU) to regulate the use of chemical substances in the EU. Compounds restricted under the REACH regulation are restricted in use in the EU. DOP, DBP, and other plasticizers scheduled to be restricted under the REACH regulation necessitate alternative compounds.

Accordingly, it is an object of the present invention to provide a pressure-sensitive adhesive tape that uses, as a plasticizer, an alternative compound to DOP and DBP and has excellent tackiness and unwindability, where DOP and DBP are scheduled to be restricted under the REACH regulation.

Solution to Problem

After intensive investigations, the present inventors have found a pressure-sensitive adhesive tape including a poly(vinyl chloride) substrate and a pressure-sensitive adhesive layer on or over one side of the substrate, where the substrate contains bis(2-ethylhexyl)terephthalate. The present inventors have found that this pressure-sensitive adhesive tape can achieve the object. The present invention has been made based on these findings.

Specifically, the present invention provides, in one aspect, a pressure-sensitive adhesive tape that includes a poly(vinyl chloride) substrate and a pressure-sensitive adhesive layer. The pressure-sensitive adhesive layer is disposed on or over one side of the substrate. The poly(vinyl chloride) substrate contains 10 to 40 percent by weight of bis(2-ethylhexyl) terephthalate.

The pressure-sensitive adhesive tape preferably has an unwinding force of 0.4 N/20 mm or less at a tensile speed of 0.3 m/min and an unwinding force of 1.2 N/20 mm or less at a tensile speed of 30 m/min as measured in conformity to Japanese Industrial Standard (JIS) Z 0237:2000.

The poly(vinyl chloride) substrate preferably has a total content of bis(2-ethylhexyl)phthalate and dibutyl phthalate of 5000 ppm or less.

The pressure-sensitive adhesive layer preferably includes a (meth)acrylic pressure-sensitive adhesive. The (meth)acrylic pressure-sensitive adhesive includes, as a base polymer, a (meth)acrylic polymer having a solubility parameter of from 8.8 to 9.7 $(cal/cm^3)^{0.5}$ as determined by the Small's formula.

The pressure-sensitive adhesive tape preferably further includes a backing-agent layer on or over the other side of the poly(vinyl chloride) substrate opposite to the pressure-sensitive adhesive layer.

The (meth)acrylic polymer preferably includes, as a monomer component, a monomer capable of forming a homopolymer having a glass transition temperature of 20° C. or higher.

The pressure-sensitive adhesive tape preferably further includes a separator on or over the pressure-sensitive adhesive layer.

The present invention provides, in another aspect, a pressure-sensitive adhesive tape roll including the pressure-sensitive adhesive tape wound as a roll.

Advantageous Effects of Invention

The pressure-sensitive adhesive tape according to the embodiment of the present invention employ approximately no DOP and DBP as a plasticizer, has excellent tackiness, and can be unwound satisfactorily. The DOP and DBP are to be restricted under the REACH regulation.

DESCRIPTION OF EMBODIMENTS

Pressure-Sensitive Adhesive Tape

The pressure-sensitive adhesive tape according to the embodiment of the present invention includes a poly(vinyl chloride) substrate and a pressure-sensitive adhesive layer. The pressure-sensitive adhesive layer is disposed on or over one side of the substrate. The poly(vinyl chloride) substrate is hereinafter also referred to as a "PVC substrate". The pressure-sensitive adhesive tape may further include a backing-agent layer on or over the other side of the PVC substrate. The other side is a side of the PVC substrate opposite to the pressure-sensitive adhesive layer. The pressure-sensitive adhesive tape may further include a separator (release liner) to protect the pressure-sensitive adhesive layer surface. The pressure-sensitive adhesive tape may further include one or more additional layers within ranges not adversely affecting advantageous effects of the present invention. Such additional layers may be disposed between the PVC substrate and the backing-agent layer, on the backing-agent layer, and/or between the PVC substrate and the pressure-sensitive adhesive layer.

The pressure-sensitive adhesive tape according to the embodiment of the present invention is exemplified by a pressure-sensitive adhesive tape including the PVC substrate and the pressure-sensitive adhesive layer disposed in this order; one including the backing-agent layer, the PVC substrate, and the pressure-sensitive adhesive layer disposed in this order; one including the PVC substrate, the pressure-sensitive adhesive layer, and the separator disposed in this order; and one including the backing-agent layer, the PVC substrate, the pressure-sensitive adhesive layer, and the separator disposed in this order.

Poly(Vinyl Chloride) Substrate

The poly(vinyl chloride) substrate is a substrate mainly including a poly(vinyl chloride). The PVC substrate may have a single-layer structure or a multilayer structure.

The PVC substrate may contain the poly(vinyl chloride) in a content not critical, but typically preferably from greater than 60 percent by weight to less than 90 percent by weight based on the total weight (100 percent by weight) of the PVC substrate. Specifically, the PVC substrate preferably contains the poly(vinyl chloride) in a content of from greater than 60 percent by weight to less than 90 percent by weight. The upper limit of the poly(vinyl chloride) content is not critical, but typically preferably 89 percent by weight, more preferably 85 percent by weight, furthermore preferably 81 percent by weight, and particularly preferably 80 percent by weight. The lower limit of the poly(vinyl chloride) content is not critical, but typically preferably 61 percent by weight, more preferably 65 percent by weight, and particularly preferably 70 percent by weight. The PVC substrate, when containing the poly(vinyl chloride) in a content of greater than 60 percent by weight, may have higher rigidity. This PVC substrate may offer excellent stress relaxation and help the pressure-sensitive adhesive tape to be suitable typically for semiconductor processing. The PVC substrate, when containing the poly(vinyl chloride) in a content of less than 90 percent by weight, can be combined typically with a plasticizer and can be controlled in its properties such as softness and solvent resistance.

The poly(vinyl chloride) is preferably a soft or flexible poly(vinyl chloride) such as one having a degree of polymerization of 1500 or less. The poly(vinyl chloride) may have a degree of polymerization (average degree of polymerization) not critical, but typically preferably from 500 to 1300, and more preferably from 900 to 1300. The poly(vinyl chloride), when having a degree of polymerization within the range, may allow the PVC substrate to be soft to help the pressure-sensitive adhesive tape to have still better unwindability. The degree of polymerization may be adjusted typically by the amount (proportion) of vinyl chloride upon polymerization.

As used herein the term "degree of polymerization" refers to a value as measured in conformity to JIS K 6721:1977. Specifically, the degree of polymerization may be measured by a method for measuring an average degree of polymerization as follows.

Method for Measuring Average Degree of Polymerization

A sample poly(vinyl chloride) to be measured is dried in a desiccator at room temperature, 200±1 mg of the dried sample is weighed, transferred into a volumetric flask, combined with about 40 ml of nitrobenzene, and heated up to about 100° C. At the time when the sample appears to be completely dissolved, the sample is cooled, further combined with nitrobenzene to a total quantity of 50 ml at 30±0.05° C., and this is used as a test solution. The test solution is subjected to measurements of relative viscosity ($\eta_{rel}$) and specific viscosity ($\eta_{sp}$) using an Ubbelohde viscometer. From these data, a limiting viscosity ([$\eta$]) is determined according to Formula (1), based on which an average degree of polymerization (P) is calculated according to Formula (2):

$$[\eta]=(\sqrt{2}/C)\times\sqrt{(\eta_{sp}-\log_e\eta_{rel})} \quad (1)$$

$$P=500\times\{antilog_{10}([\eta]/0.168)-1\} \quad (2)$$

where C represents the concentration (g/l) of the test solution.

The PVC substrate may further include one or more other resins in addition to the poly(vinyl chloride) within ranges not adversely affecting the advantageous effects of the present invention. The other resins than the poly(vinyl chloride) are exemplified by polyolefins, polyesters, polyimides, and polyamides. The PVC substrate may include each of different resins (other resins) alone or in combination. The PVC substrate may contain the other resin or resins than the poly(vinyl chloride) in a content not critical, but typically preferably from 1.0 to 10.0 percent by weight, and more preferably from 1.0 to 5.0 percent by weight, based on the total weight (100 percent by weight) of the PVC substrate.

The PVC substrate includes bis(2-ethylhexyl)terephthalate (DOTP, dioctyl terephthalate) as a plasticizer. DOTP is a compound not restricted under the REACH regulation.

The poly(vinyl chloride), as being combined with the plasticizer, is softened appropriately. This allows the substrate to have better flexibility and helps the pressure-sensitive adhesive tape to have better conformability to an adherend.

The poly(vinyl chloride) is softened probably because the plasticizer disperses into between molecules of the poly (vinyl chloride) to break off the interaction between the poly(vinyl chloride) molecules and to cause the poly(vinyl chloride) molecules to slide to each other. The dispersion of the plasticizer into the poly(vinyl chloride) molecules is considered to be important. DOTP is structurally similar to DOP, but has a melting point of about 30° C., which is higher than the melting point of DOP by nearly 80° C. It has been believed that DOTP, when used at room temperature, exists not in a complete liquid state and fails to exhibit uniform effects as a plasticizer.

However, the present inventors have made investigations and studies using DOTP while being free from the common general technical knowledge as above. Surprisingly, as a result, they have found that DOTP, when used in a poly (vinyl chloride) substrate, can impart the softening effect uniformly to the entire substrate. Specifically, DOTP mixed in the substrate was concerned to be precipitated as a solid upon long-term storage at room temperature, but this did not occur. As used herein the term "long-term storage at room temperature" refers to a storage at 23±3° C. for one week. The present inventors have further found that the pressure-sensitive adhesive tape using DOTP offers can satisfactorily conform to an adherend and has tackiness and unwindability at levels of a pressure-sensitive adhesive tape using DOP. The "unwindability" refers to such a property as to be easily unwound from a roll.

DOTP has good compatibility with the poly(vinyl chloride) and is resistant to bleedout to the substrate surface. In particular, DOTP is more resistant to bleedout to the substrate surface as compared with DOP. The PVC substrate including DOTP less soils or stains the pressure-sensitive adhesive layer, the adherend, and the production equipment.

The PVC substrate may further include one or more other plasticizers not restricted under the REACH regulation, in addition to DOTP. Such other plasticizers not restricted under the REACH regulation are hereinafter also simply referred to as "additional plasticizer(s)". The additional plasticizers are exemplified by adipic acid polyesters and other polyester plasticizers, diisononyl cyclohexanedicarboxylate (DINCH), and tri(2-ethylhexyl)trimellitate (TOTM). The PCV substrate may include each of different additional plasticizers alone or in combination, but preferably include DOTP alone as a plasticizer. This is preferred for good tackiness and unwindability of the pressure-sensitive adhesive tape.

The PVC substrate, if using a high-molecular polyester plasticizer, may cause the pressure-sensitive adhesive tape to have inferior mechanical properties. In contrast, the PVC substrate, if using a low-molecular polyester plasticizer, may cause the pressure-sensitive adhesive tape to have inferior tackiness and/or unwindability.

The PVC substrate contains 10 to 40 percent by weight of DOTP. Specifically, the PVC substrate has a DOTP content of from 10 to 40 percent by weight based on the total weight (100 percent by weight) of the substrate. The upper limit of the DOTP content is typically preferably 39 percent by weight, more preferably 35 percent by weight, and particularly preferably 30 percent by weight. The lower limit of the DOTP content is typically preferably 11 percent by weight, more preferably 15 percent by weight, and furthermore preferably 20 percent by weight. The PVC substrate, as containing DOTP in a content within the range, has excellent flexibility and allows the pressure-sensitive adhesive tape to have excellent tackiness and unwindability.

The PVC substrate may contain DOTP in an amount not critical, but typically preferably from 10 to 80 parts by weight, more preferably from 10 to 60 parts by weight, and furthermore preferably from 20 to 40 parts by weight, per 100 parts by weight of the poly(vinyl chloride). The PVC substrate, when containing DOTP in an amount within the range, may allow the pressure-sensitive adhesive tape to have still better tackiness and unwindability.

The PVC substrate may contain one or more additional plasticizers in a total content not critical, but typically preferably from 20 to 40 percent by weight based on the total weight (100 percent by weight) of the PVC substrate. The PVC substrate, when containing the additional plasticizers in a total content within the range, can still more satisfactorily follow deformation typically upon drawing.

The PVC substrate is preferably not to be restricted under the REACH regulation, namely, preferably does not include a compound restricted under the REACH regulation in a content within the restricted range. More preferably, the PVC substrate is approximately devoid of compounds restricted under the REACH regulation. For reduction of the environmental impact, the PVC substrate has a total content of bis(2-ethylhexyl)phthalate (DOP) and dibutyl phthalate (DBP) of typically preferably 5000 ppm or less, and more preferably 3000 ppm or less, based on the total weight (100 percent by weight) of the PVC substrate. In particular, the total content is desirably controlled to less than 1000 ppm in countries under the REACH regulation. Particularly preferably, the PVC substrate is devoid of DOP and DBP.

Though not limited, the PVC substrate may further include any of other components such as stabilizers, colorants, antistatic agents, and ultraviolet absorbers.

The PVC substrate may have a maximum elongation not critical, but typically preferably 100% or more, and more preferably from 200% to 1000% as measured in conformity with JIS K 7127. The PVC substrate, when having a maximum elongation within the range, may have appropriate ductility and allow the pressure-sensitive adhesive tape according to the embodiment of the present invention to have better conformability to an adherend.

The PVC substrate may have a thickness not critical, but typically preferably from 20 to 200 µm, more preferably from 40 to 150 µm, and furthermore preferably from 50 to 100 µm. The PVC substrate, when having a thickness of 20 µm or more, may be handled satisfactorily. The PVC substrate, when having a thickness of 200 µm or less, may allow the pressure-sensitive adhesive tape to satisfactorily follow deformation typically upon drawing.

The PVC substrate may have undergone a processing such as a surface treatment on its surface. The surface treatment is exemplified by, but not limited to, physical treatments such as corona discharge treatment, plasma treatment, sand mat treatment, exposure to ozone, exposure to flame, exposure to a high-voltage electric shock, and treatment with ionizing radiation; chemical treatments such as chromate treatment; and adhesion facilitating treatments (coating treatments) with a coating agent (primer).

The PVC substrate may be produced typically, but not limitatively, by shaping or forming into a sheet. The shaping may be performed by a technique such as calendering film-formation, casting film-formation, blow-extrusion, or T-die extrusion.

Backing-Agent Layer

The backing-agent layer is exemplified by a layer including a backing agent. The backing agent is exemplified by a backing agent including a release agent (mold-release agent) and a resin. The release agent is exemplified by a silicone resin and a long-chain alkyl acrylate (co-)polymer (long-chain alkyl release agent). Examples of the resin include an (meth)acrylic polymer and an ethylene-vinyl acetate copolymer. Among them, preferred are a backing agent including a silicone resin and a (meth)acrylic polymer; and a backing agent including an ethylene-vinyl acetate copolymer and a long-chain alkyl acrylate (co-)polymer. In particular, preferred is a backing agent including a silicone resin and a (meth)acrylic polymer, because this backing agent may offer good conformability between the backing-agent layer and the PVC substrate and allow the pressure-sensitive adhesive tape according to the embodiment of the present invention to more satisfactorily follow deformation typically upon drawing.

As used herein the term "(meth)acrylic" refers to "acrylic and/or methacrylic". The (meth)acrylic polymer contained in the backing-agent layer is herein also referred to as a "(meth)acrylic polymer A".

The silicone resin is exemplified by, but not limited to, addition silicones prepared by curing an alkenyl-containing polydialkylsiloxane and a polydialkylhydrogensiloxane through an addition reaction by the catalysis of a platinum group compound (platinum group catalyst); and condensation silicones prepared by allowing a methylol-containing polydialkylsiloxane to react with a polydialkylhydrogensiloxane by the catalysis of a tin catalyst. The addition silicones are exemplified by KS-776A and KS-839L (each supplied by Shin-Etsu Chemical Co., Ltd.). The condensation silicones are exemplified by KS-723A and KS-723B (each supplied by Shin-Etsu Chemical Co., Ltd.).

In addition to the addition silicones and condensation silicones, examples of the silicone resins for use herein further include silicone/acrylic graft polymers and silicone/acrylic block polymers. The silicone/acrylic graft polymers are exemplified by SYMAC GS-30, SYMAC GS101, SYMAC US-270, SYMAC US-350, and SYMAC US-380 (each supplied by Toagosei Co., Ltd.). The silicone/acrylic block polymers are exemplified by MODIPER FS700, MODIPER FS710, MODIPER FS720, MODIPER FS730, and MODIPER FS770 (each supplied by NOF CORPORATION).

To produce the silicone resin, any of other agents or additives such as crosslinking agents and cross-linking promoters may be employed as appropriate, in addition to the platinum group catalyst or tin catalyst. The silicone resin may be in any form such as a solution in an organic solvent (e.g., toluene), an emulsion, or a solvent-free resin including the silicone alone.

The long-chain alkyl acrylate (co-)polymer is exemplified by, but not limited to, polymers of a long-chain alkyl(meth)acrylate containing 12 or more carbon atoms (e.g., 12 to 30 carbon atoms); copolymers of a long-chain alkyl(meth)acrylate with another vinyl monomer; and long-chain alkyl-modified polymers obtained by allowing a poly(vinyl alcohol) to react with a long-chain alkyl component such as a long-chain alkyl isocyanate. The long-chain alkyl acrylate (co-)polymer is also available as commercial products such as PEELOIL 1010 and PEELOIL 1050 (each supplied by Ipposha Oil Industries, Co., Ltd.).

The (meth)acrylic polymer A is a polymer prepared by polymerizing a monomer component including a (meth)acrylic monomer as a main monomer. The monomer component may include each of different monomers alone or in combination.

As used herein the term "main monomer" refers to that the monomer in question is contained in a content of 50 percent by weight or more based on the total amount of the monomer component. The monomer component to constitute the (meth)acrylic polymer A is herein also referred to as a "monomer component A".

As used herein the term "(meth)acrylic monomer" refers to a monomer containing a (meth)acryloyl group (acryloyl group and/or methacryloyl group). The (meth)acrylic monomer in the monomer component A is exemplified by a (meth)acrylate and (meth)acrylic acid. The monomer component A may include each of different (meth)acrylic monomers alone or in combination.

The (meth)acrylate to be contained in the monomer component A is exemplified by alkyl(meth)acrylates of $C_1$-$C_{11}$ alkyl (including cycloalkyl); and hydroxy-containing (meth)acrylates. The monomer component A may contain each of different (meth)acrylates alone or in combination.

The alkyl(meth)acrylates of $C_1$-$C_{11}$ alkyl (including cycloalkyl) to be contained in the monomer component A are exemplified by alkyl(meth)acrylates of $C_1$-$C_{11}$ alkyl (including cycloalkyl), such as methyl(meth)acrylate, ethyl(meth)acrylate, propyl(meth)acrylate, isopropyl(meth)acrylate, butyl(meth)acrylate, isobutyl(meth)acrylate, sec-butyl(meth)acrylate, t-butyl(meth)acrylate, pentyl(meth)acrylate, amyl(meth)acrylate, hexyl(meth)acrylate, cyclohexyl(meth)acrylate, heptyl(meth)acrylate, 2-ethylhexyl(meth)acrylate, octyl(meth)acrylate, isooctyl(meth)acrylate, nonyl(meth)acrylate, isononyl(meth)acrylate, decyl(meth)acrylate, isodecyl(meth)acrylate, and undecyl(meth)acrylate. Among them, alkyl(meth)acrylates of $C_2$-$C_{10}$ alkyl (including cycloalkyl) are preferred.

The hydroxy-containing (meth)acrylates to be contained in the monomer component A are exemplified by 2-hydroxyethyl(meth)acrylate, 2-hydroxypropyl(meth)acrylate, and 4-hydroxybutyl(meth)acrylate. The monomer component A may include each of different hydroxy-containing (meth)acrylates alone or in combination.

The monomer component A may include at least one selected from the group consisting of hydroxy-containing monomers excluding the hydroxy-containing (meth)acrylates; and carboxy-containing monomers excluding (meth)acrylic acid.

The hydroxy-containing monomers to be contained in the monomer component A are exemplified by allyl alcohol. The monomer component A may include each of different hydroxy-containing monomers alone or in combination.

The carboxy-containing monomers to be contained in the monomer component A are exemplified by carboxyethyl(meth)acrylate, carboxypentyl(meth)acrylate, crotonic acid, maleic acid, fumaric acid, and itaconic acid. The monomer component A may include each of different carboxy-containing monomers alone or in combination.

The monomer component A may contain the (meth)acrylic monomer(s) in a content not critical, but typically preferably 50 percent by weight or more, more preferably from 70 to 100 percent by weight, furthermore preferably from 90 to 100 percent by weight, and particularly preferably from 95 to 100 percent by weight, based on the total amount (100 percent by weight) of the monomer component A.

The monomer component A may contain the hydroxy-containing (meth)acrylate(s) in an amount not critical, but typically preferably from 2 to 30 percent by weight, more preferably from 3 to 25 percent by weight, and furthermore preferably from 5 to 20 percent by weight, based on the total amount (100 percent by weight) of monomer components excluding the hydroxy-containing (meth)acrylate(s). The monomer component A, when containing the hydroxy-containing (meth)acrylate(s) in an amount within the range, may allow the backing-agent layer to have a fine relief structure (finely patterned indented structure) on its surface. This may allow the pressure-sensitive adhesive tape to resist blocking in the form of a roll and to resist tearing and breakage upon unwinding from the roll.

The monomer component A may have a ratio (by weight) of the (meth)acrylic acid to the (meth)acrylate(s) not critical, but typically preferably from 0:100 to 20:80, more preferably from 0:100 to 10:90, and furthermore preferably from 0:100 to 5:95. The monomer component A, when having a ratio of the (meth)acrylic acid to the (meth)acrylate(s) within the range, may help the backing-agent layer to efficiently have a fine relief structure on its surface; and this may allow the pressure-sensitive adhesive tape to resist blocking in the form of a roll and to resist tearing and breakage upon unwinding from the roll.

The (meth)acrylic polymer A may be produced typically, but not limitatively, by polymerizing the monomer component A according to a known or common procedure.

The (meth)acrylic polymer A may have a solubility parameter (SP) not critical, but typically preferably from 9.0 to 12.0 $(cal/cm^3)^{0.5}$, more preferably from 9.5 to 11.5 $(cal/cm^3)^{0.5}$, and furthermore preferably from 9.5 to 11.0 $(cal/cm^3)^{0.5}$. As used herein the term "solubility parameter" refers to a value of solubility parameter as determined by the Small's method. The solubility parameter may be calculated typically by a method described in known literature (e.g., *Journal of Applied Chemistry*, 3, 71, 1953).

The (meth)acrylic polymer A may have a glass transition temperature (Tg) not critical, but typically preferably from −50° C. to 20° C., and more preferably from −45° C. to 10° C. The (meth)acrylic polymer A, when having a glass transition temperature of 10° C. or lower, may allow the backing-agent layer to have appropriate flexibility and allow the pressure-sensitive adhesive tape to satisfactorily follow deformation and to resist blocking.

The glass transition temperature (Tg, in degree centigrade (° C.)) of a polymer herein may employ a glass transition temperature (theoretical value) determined by the Fox equation. The Fox equation is a relational expression between the glass transition temperature Tg (° C.) of the polymer and the glass transition temperature Tgi (° C.) of a homopolymer of each monomer constituting the polymer, where the homopolymer is prepared by polymerizing the monomer alone. The Fox equation is expressed as follows:

$$1/(273+Tg)=\Sigma(Wi/(273+Tgi))$$

where Tg (° C.) represents the glass transition temperature of the polymer; Wi represents the weight fraction of a monomer i; and Tgi (° C.) represents the glass transition temperature of a homopolymer of the monomer i.

As used herein the term "glass transition temperature (Tg) of the homopolymer" refers to the "glass transition temperature (Tg) of the homopolymer of the monomer in question". Specifically, such glass transition temperature (Tg) of the homopolymer can be found as numerical values in "Polymer Handbook" (3rd Ed., John Wiley & Sons, Inc, 1987). The "glass transition temperature Tg of the homopolymer of a monomer" not described in the literature refers to a value as determined typically by a measurement method described below (see JP-A No. 2007-51271). Specifically, 100 parts by weight of a monomer, 0.2 part by weight of 2,2'-azobis (isobutyronitrile), and 200 parts by weight of ethyl acetate as a polymerization solvent are placed in a reactor equipped with a thermometer, a stirrer, a nitrogen inlet tube, and a reflux condenser, and the mixture is stirred for one hour while introducing a nitrogen gas. After removing oxygen from the polymerization system in this manner, the mixture is raised in temperature to 63° C. and allowed to react for 10 hours. The mixture is then cooled down to room temperature to give a homopolymer solution having a solids content of 33 percent by weight. The homopolymer solution is cast onto a separator and dried to give a test sample (homopolymer sheet) having a thickness of about 2 mm. The test sample is blanked into a disc having a diameter of 7.9 mm and placed between parallel plates, whose viscoelasticity is measured in a shear mode using a viscoelastometer (ARES, supplied by Rheometric Scientific F. E. Ltd. (now TA Instruments)) while applying a shear strain with a frequency of 1 Hz at temperatures of from −70° C. to 150° C. and a rate of temperature rise of 5° C./min, and the peak top temperature of tan δ is taken as the glass transition temperature Tg of the homopolymer. The glass transition temperature Tg of the polymer may also be measured by the method.

The ethylene-vinyl acetate copolymer is exemplified by, but not limited to, an ethylene-vinyl acetate copolymer polymerized from a monomer component including vinyl acetate in a content of from 10 to 40 percent by weight (preferably from 25 to 35 percent by weight) based on the total amount (100 percent by weight) of the monomer component. The ethylene-vinyl acetate copolymer is also available typically under the trade names of EVAFLEX EV-150 (from DUPONT-MITSUI POLYCHEMICALS CO., LTD.) and Nipoflex 722 (from Tosoh Corporation).

Though not limited, the backing agent may further include one or more additives within ranges not adversely affecting the advantageous effects of the present invention. Such additives are exemplified by catalysts, ultraviolet absorbers, fillers, age inhibitors (antioxidants), tackifiers, pigments, dyestuffs, and silane coupling agents. The catalysts are exemplified by, but not limited to, tin catalysts. The backing agent may be diluted with a solvent for better coatability.

The backing agent may have a ratio (by weight) of the release agent to the resin of typically preferably from 1:50 to 50:1, more preferably from 1:30 to 30:1, furthermore preferably from 1:10 to 10:1, particularly preferably from 1:5 to 5:1, and most preferably from 1:5 to 3:1. The ratio of the release agent to the resin is exemplified by the ratio (by weight) of the silicone resin to the (meth)acrylic polymer A; and the ratio (by weight) of the long-chain alkyl acrylate (co-)polymer to the ethylene-vinyl acetate copolymer. The backing agent, if containing the silicone resin in an excessively large amount, may have poor chemical affinity for the PVC substrate backside and may inferiorly conform to the PVC substrate backside. In addition, the resulting backing-agent layer may inferiorly follow deformation typically upon drawing and may be fractured upon drawing, thus causing soiling. In contrast, the backing agent, if containing the (meth)acrylic polymer in an excessively large amount, may cause the backing-agent layer to act as a pressure-sensitive adhesive layer to thereby cause blocking.

The backing-agent layer may be formed typically, but not limitatively, by applying the backing agent to one side of the PVC substrate, and drying the applied agent. The coating (application) may be performed typically using any of bar coaters, gravure coaters, spin coaters, roll coaters, knife coaters, and applicators.

The backing-agent layer may have an arithmetic mean surface roughness Ra not critical, but typically preferably 0.1 µm or more, more preferably from 0.1 to 3.0 µm, furthermore preferably from 0.2 to 2.0 µm, particularly preferably from 0.3 to 2.0 µm, and most preferably from 0.5 to 2.0 µm. The backing-agent layer, when having an arithmetic mean surface roughness Ra within the range, may allow the pressure-sensitive adhesive tape to resist blocking in the form of a roll and to resist tearing and breakage upon unwinding from the roll.

The backing-agent layer may have a phase separation structure. The backing-agent layer, when having a phase separation structure, may more readily have a fine relief structure on its surface. The presence of the relief structure may allow the pressure-sensitive adhesive tape to effectively resist blocking in the form of a roll and to resist tearing and breakage upon unwinding from the roll.

The backing-agent layer preferably includes a silicone-resin-rich phase and a (meth)acrylic-polymer-rich phase. The silicone-resin-rich phase includes the silicone resin in a larger amount as compared with the (meth)acrylic polymer. The (meth)acrylic-polymer-rich phase includes the (meth) acrylic polymer in a larger amount as compared with the silicone resin. The backing-agent layer more preferably has a phase separation structure in which the silicone-resin-rich phase and the (meth)acrylic-polymer-rich phase are present separately. More preferably, the silicone-resin-rich phase is present adjacent to the air interface (opposite to the PVC substrate), and the (meth)acrylic-polymer-rich phase is present adjacent to the PVC substrate in the phase separation structure. Assume that the backing-agent layer has the phase separation structure as above. This backing-agent layer may effectively resist blocking by the action of the silicone-resin-rich phase adjacent to the air interface, and may have better conformability to the PVC substrate by the action of the (meth)acrylic-polymer-rich phase adjacent to the plastic film (PVC substrate). The resulting pressure-sensitive adhesive tape may more satisfactorily follow deformation. The phase separation structure may be controlled by the blending ratio between the silicone resin and the (meth)acrylic polymer. The silicone-resin-rich phase and the (meth)acrylic-polymer-rich phase may be identified typically by observation using an electron microscope such as transmission electron microscope (TEM), scanning electron microscope (SEM), and field emission scanning electron microscope (FE-SEM). The two-phase separation structure may be identified or detected typically by identifying and distinguishing the phases based on variations in density of an image for morphological observation. The two-phase separation structure may also be identified by observing the compositional changes of amounts of elements (e.g., silicon and carbon) while varying the probe light depth from the air interface of the backing-agent layer to the inside of the layer. The observation is performed by infrared absorption spectroscopy according to the total reflection method. The two-phase separation structure may also be identified by observation with an X-ray microanalyzer or through X-ray photoelectron spectroscopy. These techniques may be employed in combination.

The backing-agent layer may have a thickness not critical, but typically preferably from 0.01 to 10 μm, more preferably from 0.1 to 5 μm, and furthermore preferably from 0.1 to 2 μm. The backing-agent layer, when having a thickness of 0.01 μm or more, may allow the pressure-sensitive adhesive tape to resist blocking and to be produced easily. The backing-agent layer, when having a thickness of 10 μm or less, may satisfactorily follow deformation typically upon drawing.

Pressure-Sensitive Adhesive Layer

The pressure-sensitive adhesive layer is exemplified by a pressure-sensitive adhesive layer (e.g., a tacky adhesive layer) including a pressure-sensitive adhesive. The pressure-sensitive adhesive is exemplified by, but not limited to, pressure-sensitive adhesives including pressure-sensitive adhesive components. The pressure-sensitive adhesive components are exemplified by (meth)acrylic polymers; natural rubbers; special natural rubbers grafted with a monomer such as methyl methacrylate; and synthetic rubbers such as styrene-butadiene-styrene rubber (SBS), styrene-butadiene rubber (SBR), styrene-ethylene/propylene-styrene rubber (SEPS), styrene-isoprene-styrene rubber (SIS), styrene-ethylene/butylene-styrene rubber (SEBS), polybutenes, polyisobutenes, polyisobutylenes, and isobutylene-isoprene rubbers. Among them, preferred are (meth)acrylic pressure-sensitive adhesives that are pressure-sensitive adhesives each including a (meth)acrylic polymer; of which more preferred are (meth)acrylic pressure-sensitive adhesives each including a (meth)acrylic polymer as a base polymer.

The (meth)acrylic polymer to be contained in the (meth)acrylic pressure-sensitive adhesive is herein also referred to as a "(meth)acrylic polymer B".

The (meth)acrylic polymer B is exemplified by, but not limited to, a (meth)acrylic polymer prepared by polymerizing a monomer component including at least one (meth)acrylic monomer as a main monomer. The monomer component may include each of different (meth)acrylic monomers alone or in combination.

The monomer component to constitute the (meth)acrylic polymer B is also referred to as "monomer component B".

The (meth)acrylic monomer to be contained in the monomer component B is exemplified by (meth)acrylates and (meth)acrylic acid. The monomer component B may include each of different (meth)acrylic monomers alone or in combination.

The (meth)acrylates to be contained in the monomer component B are exemplified by alkyl(meth)acrylates of $C_1$-$C_{30}$ alkyl (including cycloalkyl); and hydroxy-containing (meth)acrylates. The monomer component B may include each of different (meth)acrylates alone or in combination.

The alkyl(meth)acrylates of $C_1$-$C_{30}$ alkyl (including cycloalkyl) to be contained in the monomer component B are exemplified by, but not limited to, alkyl(meth)acrylates containing $C_1$-$C_{30}$ alkyl (including cycloalkyl), such as methyl(meth)acrylate, ethyl(meth)acrylate, propyl(meth)acrylate, isopropyl(meth)acrylate, butyl(meth)acrylate, isobutyl(meth)acrylate, sec-butyl(meth)acrylate, t-butyl(meth)acrylate, pentyl(meth)acrylate, amyl(meth)acrylate, hexyl(meth)acrylate, cyclohexyl(meth)acrylate, heptyl(meth)acrylate, 2-ethylhexyl(meth)acrylate, octyl(meth)acrylate, isooctyl(meth)acrylate, nonyl(meth)acrylate, isononyl(meth)acrylate, decyl(meth)acrylate, isodecyl(meth)acrylate, undecyl(meth)acrylate, dodecyl(meth)acrylate, tridecyl(meth) acrylate, tetradecyl(meth)acrylate, pentadecyl(meth) acrylate, octadecyl(meth)acrylate (stearyl (meth)acrylate), nonadecyl(meth)acrylate, icosyl(meth)acrylate, and lauryl(meth)acrylate. Among them, preferred are alkyl(meth)acrylates containing $C_2$-$C_{20}$ alkyl (including cycloalkyl), and more preferred are alkyl(meth)acrylates containing $C_4$-$C_{18}$ alkyl (including cycloalkyl). The alkyl (meth)acrylates of $C_1$-$C_{30}$ alkyl may also be alkyl(meth)acrylates containing $C_1$-$C_{11}$ alkyl (including cycloalkyl).

The hydroxy-containing (meth)acrylates to be contained in the monomer component B are exemplified by 2-hydroxyethyl(meth)acrylate, 2-hydroxypropyl(meth)acrylate, and 4-hydroxybutyl(meth)acrylate. The monomer component B may include each of different hydroxy-containing (meth)acrylates alone or in combination.

The monomer component B preferably includes at least one monomer selected from the group consisting of hydroxy-containing (meth)acrylates and (meth)acrylic acid. This may allow the pressure-sensitive adhesive to sufficiently develop its effects as a pressure-sensitive adhesive.

The monomer component B may further include any of hydroxy-containing monomers excluding hydroxy-containing (meth)acrylates; and carboxy-containing monomers excluding (meth)acrylic acid.

The hydroxy-containing monomers to be contained in the monomer component B are exemplified by allyl alcohol. The monomer component B may include each of different hydroxy-containing monomers alone or in combination.

The carboxy-containing monomers to be contained in the monomer component B are exemplified by carboxyethyl (meth)acrylate, carboxypentyl(meth)acrylate, crotonic acid, maleic acid, fumaric acid, and itaconic acid. The monomer component B may include each of different carboxy-containing monomers alone or in combination.

In addition to the alkyl(meth)acrylates of $C_1$-$C_{30}$ alkyl (including cycloalkyl), the hydroxy-containing (meth)acrylates, and (meth)acrylic acid, the (meth)acrylic monomers are further exemplified by isobornyl(meth)acrylate, benzyl (meth)acrylate, glycidyl(meth)acrylate, and (meth)acrylamide.

The monomer component B may further include any of additional monomers excluding the (meth)acrylic monomers, the hydroxy-containing monomers, and the carboxy-containing monomers. Such additional monomers are exemplified by, but not limited to, vinyl acetate, styrene, 2-methylstyrene, acrylonitrile, and methacrylonitrile. The monomer component B preferably includes acrylonitrile so as to allow the pressure-sensitive adhesive to sufficiently develop its effects as a pressure-sensitive adhesive.

The monomer component B may contain the (meth)acrylic monomer(s) in a content not critical, but typically preferably 50 percent by weight or more (e.g., 50 to 100 percent by weight) based on the total amount (100 percent by weight) of the monomer component B. The upper limit of the (meth)acrylic monomer content may typically be 98 percent by weight. The lower limit of the (meth)acrylic monomer content is typically more preferably 55 percent by weight, furthermore preferably 70 percent by weight, still more preferably 85 percent by weight, still furthermore preferably 90 percent by weight, and particularly preferably 95 percent by weight. In an embodiment, the monomer component B contains two or more different (meth)acrylic monomers. In this embodiment, the term "(meth)acrylic monomer content" refers to the total content of the two or more different (meth)acrylic monomers.

In an embodiment, the monomer component B includes one or more hydroxy-containing (meth)acrylates. In this embodiment, the monomer component B may contain the hydroxy-containing (meth)acrylates in a content not critical, but typically preferably from 0.1 to 20 percent by weight, and more preferably from 0.1 to 10 percent by weight, based on the total amount (100 percent by weight) of the monomer component B. In an embodiment, the monomer component B includes (meth)acrylic acid. In this embodiment, the monomer component B may contain (meth)acrylic acid in a content not critical, but typically preferably from 0.1 to 20 percent by weight, more preferably from 0.1 to 10 percent by weight, and furthermore preferably from 2 to 10 percent by weight, based on the total amount (100 percent by weight) of the monomer component B.

In the preferred embodiment, the monomer component B includes at least one selected from the group consisting of hydroxy-containing (meth)acrylates and (meth)acrylic acid. The monomer component B in this embodiment, upon the use of a crosslinking agent, may undergo an efficient crosslinking reaction with the crosslinking agent to allow the pressure-sensitive adhesive to sufficiently develop its effects as a pressure-sensitive adhesive. In an embodiment, the monomer component B contains the hydroxy-containing (meth)acrylate in a content within the range and/or contains the (meth)acrylic acid in a content within the range. The pressure-sensitive adhesive tape in this embodiment may effectively less cause fracture of the adherend upon peeling operation. In contrast, the monomer component B, if containing the hydroxy-containing (meth)acrylate in a content greater than the range and/or containing (meth)acrylic acid in a content greater than the range, may cause blocking of the pressure-sensitive adhesive tape or may cause fracture of the adherend upon peeling operation.

In an embodiment, the monomer component B includes one or more additional monomers. In this embodiment, the monomer component B may contain the additional monomers in a content not critical, but typically preferably from 0.1 to 45 percent by weight based on the total amount (100 percent by weight) of the monomer component B. In an embodiment, the monomer component B contains acrylonitrile. The monomer component B in this embodiment may contain acrylonitrile in a content of typically preferably from 0.1 to 15 percent by weight based on the total amount (100 percent by weight) of the monomer component B.

The monomer component B preferably includes a high-Tg monomer. The term "high-Tg monomer" refers to a monomer capable of forming a homopolymer having a high glass transition temperature (Tg).

The plasticizer contained in the PVC substrate may be bled out and migrate into the pressure-sensitive adhesive layer. The plasticizer, if migrating into the pressure-sensitive adhesive layer, may cause the pressure-sensitive adhesive layer to have lower cohesive force and to be excessively soft. The monomer component B, when containing the high-Tg monomer, may allow the pressure-sensitive adhesive layer to have higher cohesive force and to resist reduction in cohesive force.

The homopolymer derived from the high-Tg monomer may have a glass transition temperature not critical, but typically 20° C. or higher, preferably 30° C. or higher, and more preferably 90° C. or higher. Specifically, the monomer component B preferably includes a monomer capable of forming a homopolymer having a glass transition temperature of 20° C. or higher. The monomer, when having a glass transition temperature of its homopolymer within the range, may help the pressure-sensitive adhesive layer to have higher cohesive force.

The high-Tg monomer may be any of the monomers exemplified as monomers to be contained in the monomer component B, or be any other monomer. In particular, the monomer component B preferably includes a monomer that is selected from the monomers exemplified as monomers to be contained in the monomer component B and is capable of forming a homopolymer having a high glass transition temperature (Tg) (e.g., one having a glass transition temperature Tg of 20° C. or higher). The monomer component B may include each of different high-Tg monomers alone or in combination.

The high-Tg monomers are exemplified by, but not limited to, methyl methacrylate (Tg: 105° C.), ethyl methacrylate (Tg: 65° C.), cyclohexyl methacrylate (Tg: 83° C.), isobornyl acrylate (Tg: 94° C.), isobornyl methacrylate (Tg: 150° C.), benzyl methacrylate (Tg: 54° C.), glycidyl methacrylate (Tg: 46° C.), stearyl methacrylate (Tg: 38° C.), 2-hydroxypropyl methacrylate (Tg: 26° C.), 2-hydroxyethyl methacrylate (Tg: 55° C.), acrylic acid (Tg: 106° C.), and methacrylic acid (Tg: 227° C.). In addition to the above monomers, the high-Tg monomers are further exemplified by vinyl acetate (Tg: 32° C.), acrylonitrile (Tg: 97° C.), methacrylonitrile (Tg: 120° C.), styrene (Tg: 80° C.), 2-methylstyrene (Tg: 136° C.), and acrylamide (Tg: 165° C.) Among them, methyl methacrylate, acrylic acid, vinyl acetate, and acrylonitrile are preferred because they are less affected by the change in cohesive force caused by the plasticizer.

In an embodiment, the monomer component B includes a high-Tg monomer. In this embodiment, the monomer component B may contain the high-Tg monomer in a content not critical, but typically preferably from 1 to 50 percent by weight based on the total amount (100 percent by weight) of the monomer component B. The upper limit of the high-Tg monomer content is preferably 46 percent by weight, more preferably 40 percent by weight, and particularly preferably 35 percent by weight. The lower limit of the high-Tg monomer content is preferably 4 percent by weight, more preferably 5 percent by weight, and furthermore preferably 10 percent by weight. The monomer component B, when containing the high-Tg monomer in a content within the range, may allow the pressure-sensitive adhesive layer to have still better tackiness and cohesion. In an embodiment, the monomer component B includes two or more different high-Tg monomers. In this embodiment, the term "high-Tg monomer content" refers to the total content of the two or more different high-Tg monomers.

The monomer component B preferably, but not limitatively, has a (meth)acrylic monomer content of 50 percent by weight or more and a high-Tg monomer content of from 1 to 50 percent by weight based on the total amount (100 percent by weight) of the monomer component B. In particular, the monomer component B preferably has a content of alkyl(meth)acrylates of $C_1$-$C_{30}$ alkyl (including cycloalkyl) of 50 percent by weight or more, a content of at least one monomer selected from the group consisting of hydroxy-containing (meth)acrylates and (meth)acrylic acid of from 0.1 to 20 percent by weight, and a high-Tg monomer content of from 1 to 50 percent by weight, based on the total amount (100 percent by weight) of the monomer component B.

The (meth)acrylic polymer B may be produced typically, but not limitatively, by polymerizing the monomer component B according to a known or common procedure.

The (meth)acrylic polymer B may have a solubility parameter not critical, but typically preferably from 8.8 to 9.7 $(cal/cm^3)^{0.5}$ for good compatibility with the plasticizer. The upper limit of the solubility parameter is typically more preferably 9.5 $(cal/cm^3)^{0.5}$, and furthermore preferably 9.4 $(cal/cm^3)^{0.5}$. The lower limit of the solubility parameter is typically more preferably 8.9 $(cal/cm^3)^{0.5}$. The pressure-sensitive adhesive layer, when employing such a (meth) acrylic polymer having a solubility parameter within the range, may have better compatibility with DOTP. This may impede bleeding of DOTP to the pressure-sensitive adhesive layer surface even when DOTP is bled out from the PVC substrate to its surface or is contained in the pressure-sensitive adhesive layer. The resulting pressure-sensitive adhesive tape may thereby have excellent tackiness.

Diisononyl cyclohexanedicarboxylate (DINCH) and tri-2-ethylhexyl trimellitate (TOTM) may have inferior compatibility with the (meth)acrylic pressure-sensitive adhesive to be bled to the pressure-sensitive adhesive layer surface to thereby cause inferior tackiness of the adhesive layer.

The pressure-sensitive adhesive (e.g., the acrylic pressure-sensitive adhesive) to form the pressure-sensitive adhesive layer preferably includes a crosslinking agent. The crosslinking agent is exemplified by, but not limited to, crosslinking agents of epoxides, isocyanates, melamines, peroxides, metal alkoxides, metal chelates, metal salts, carbodiimides, oxazolines, aziridines, and amines. Among them, preferred are crosslinking agents of epoxides, isocyanates, and melamines. The pressure-sensitive adhesive may include each of different crosslinking agents alone or in combination.

The pressure-sensitive adhesive (e.g., the acrylic pressure-sensitive adhesive) constituting the pressure-sensitive adhesive layer may include a plasticizer. The plasticizer is preferably selected from plasticizers not restricted under the REACH regulation. Such preferred plasticizers include plasticizers not restricted under the REACH regulation and selected from phthalic acid esters; trimellitic acid esters such as W-700 (supplied by DIC Corporation) and trioctyl trimellitate; adipic acid esters such as D620 (supplied by J-PLUS Co., Ltd.), dioctyl adipate, and diisononyl adipate; phosphoric esters such as tricresyl phosphate; adipic acid esters; citric acid esters such as acetyl tributyl citrate; sebacic acid esters; azelaic acid esters; maleic acid esters; benzoic acid esters; polyether polyesters; epoxy polyesters such as epoxidized soybean oil and epoxidized linseed oil; and polyesters such as low-molecular polyesters each including a carboxylic acid and glycol. Among them, bis(2-ethylhexyl)terephthalate is preferred. The pressure-sensitive adhesive may include one or more different plasticizers alone or in combination.

The pressure-sensitive adhesive to form the pressure-sensitive adhesive layer may include a catalyst so as to promote, for example, a crosslinking reaction. The catalyst is exemplified by, but not limited to, organometallic compounds such as tetraisopropyl titanate, tetra-n-butyl titanate, tin octoate, lead octoate, cobalt octoate, zinc octoate, calcium octoate, lead naphthenate, cobalt naphthenate, dibutyltin diacetate, dibutyltin dioctoate, dibutyltin dilaurate, dioctyltin dilaurate, and dibutyltin maleate; basic compounds such as butylamine, dibutylamine, hexylamine, t-butylamine, ethylenediamine, isophoronediamine, imidazole, lithium hydroxide, potassium hydroxide, and sodium methylate; and acidic compounds such as p-toluenesulfonic acid, trichloroacetic acid, phosphoric acid, phosphoric acid esters (e.g., monoalkyl phosphates, dialkyl phosphates, and phosphoric ester of β-hydroxyethyl acrylate), monoalkyl phosphites, and dialkyl phosphites. Among them, organometallic compounds are preferred, of which tin catalysts are more preferred. The tin catalysts are exemplified by tin octoate, dibutyltin diacetate, dibutyltin dioctoate, dibutyltin dilaurate, dioctyltin dilaurate, and dibutyltin maleate. The pressure-sensitive adhesive may include each of different catalysts alone or in combination.

The pressure-sensitive adhesive to form the pressure-sensitive adhesive layer may further include one or more of solvents (e.g., toluene) and additives. The additives are exemplified by ultraviolet absorbers, fillers, age inhibitors (antioxidants), tackifiers, pigments, dyestuffs, and silane coupling agents.

The (meth)acrylic pressure-sensitive adhesive to form the pressure-sensitive adhesive layer may include the (meth) acrylic polymer B in a content not critical, but typically preferably from 0.05 to 85 percent by weight based on the total amount (100 percent by weight) of the (meth)acrylic pressure-sensitive adhesive. The upper limit of the (meth) acrylic polymer B content is typically preferably 80 percent by weight, more preferably 75 percent by weight, furthermore preferably 70 percent by weight, and particularly preferably 65 percent by weight. The lower limit of the (meth)acrylic polymer B content is typically preferably 0.10 percent by weight, more preferably 0.50 percent by weight, furthermore preferably 40 percent by weight, and particularly preferably 50 percent by weight. The (meth)acrylic pressure-sensitive adhesive, when containing the (meth) acrylic polymer B in a content within the range, may offer excellent tackiness.

The pressure-sensitive adhesive (e.g., the (meth)acrylic pressure-sensitive adhesive) to form the pressure-sensitive adhesive layer may contain the crosslinking agent(s) in an amount (total amount) not critical, but typically preferably from 0.1 to 20 parts by weight per 100 parts by weight of the pressure-sensitive adhesive component (e.g., the (meth) acrylic polymer B). The pressure-sensitive adhesive, when containing the crosslinking agent(s) in an amount within the range, may induce an appropriate crosslinking reaction so as to effectively prevent fracture of the adherend upon peeling operation.

The pressure-sensitive adhesive (e.g., the (meth)acrylic pressure-sensitive adhesive) to form the pressure-sensitive adhesive layer may contain the plasticizer(s) (e.g., DOTP) in an amount (total amount) not critical, but typically preferably from 0.1 to 70 parts by weight per 100 parts by weight of the pressure-sensitive adhesive component (e.g., the (meth)acrylic polymer B). The upper limit of the plasticizer amount is preferably 65 parts by weight, and more preferably 60 parts by weight. The lower limit of the plasticizer amount is preferably 10 parts by weight, and more preferably 20 parts by weight. The pressure-sensitive adhesive, when containing the plasticizer(s) in an amount within the range, may offer excellent flexibility and tackiness. The pressure-sensitive adhesive, if containing the plasticizer(s) in an amount of greater than 70 parts by weight, may cause the pressure-sensitive adhesive layer to be excessively soft (flexible) to thereby cause adhesive residue and/or adherend soiling.

The pressure-sensitive adhesive (e.g., the (meth)acrylic pressure-sensitive adhesive) to form the pressure-sensitive adhesive layer may contain the catalyst(s) in an amount (total amount) not critical, but typically preferably from 0.01 to 10 parts by weight per 100 parts by weight of the pressure-sensitive adhesive component (e.g., the (meth) acrylic polymer B).

The pressure-sensitive adhesive is preferably not to be restricted under the REACH regulation, namely, preferably does not include a compound restricted under the REACH regulation in a content within the restricted range. More preferably, the pressure-sensitive adhesive is approximately devoid of compounds restricted under the REACH regulation. For reduction of the environmental impact, the pressure-sensitive adhesive has a total content of bis(2-ethylhexyl)phthalate (DOP) and dibutyl phthalate (DBP) of typically preferably 5000 ppm or less, and more preferably 3000 ppm or less, based on the total weight (100 percent by weight) of the pressure-sensitive adhesive. In particular, the total content is desirably controlled to less than 1000 ppm in countries under the REACH regulation. Particularly preferably, the pressure-sensitive adhesive is devoid of DOP and DBP.

The pressure-sensitive adhesive layer may be formed typically, but not limitatively, by uniformly mixing components of the pressure-sensitive adhesive, applying the adhesive to an underlying layer, and drying the applied adhesive.

The pressure-sensitive adhesive layer may have a thickness not critical, but typically preferably from 1 to 30 μm, more preferably from 1 to 20 μm, and furthermore preferably from 3 to 15 μm. The pressure-sensitive adhesive layer, when having a thickness of 1 μm or more, may exhibit excellent tackiness. The pressure-sensitive adhesive layer, when having a thickness of 30 μm or less, may less cause adherend failure upon peeling.

Separator

The pressure-sensitive adhesive tape according to the embodiment of the present invention preferably bears a separator on or over the pressure-sensitive adhesive layer. The separator will be removed (peeled off) upon the use (e.g., upon the application to the adherend) of the pressure-sensitive adhesive tape.

The separator is exemplified by, but not limited to, those including a base material and a separator layer having a surface treated with a release agent (parting agent); low-adhesiveness base materials including fluorocarbon polymers; and low-adhesiveness base materials including non-polar polymers such as olefinic resins. The base material is exemplified by plastic films and paper. The release agent is exemplified by release agents based on silicones, long-chain alkyls, fluorine (fluorocarbons), and molybdenum sulfide. The fluorocarbon polymers are exemplified by polytetrafluoroethylenes, polychlorotrifluoroethylenes, poly(vinyl fluoride)s, poly(vinylidene fluoride)s, tetrafluoroethylene-hexafluoropropylene copolymers, and chlorofluoroethylene-vinylidene fluoride copolymers. The olefinic resins are exemplified by polyethylenes and polypropylenes.

The pressure-sensitive adhesive tape according to the embodiment of the present invention is preferably not to be restricted under the REACH regulation, namely, preferably does not include a compound restricted under the REACH regulation in a content within the restricted range. More preferably, the pressure-sensitive adhesive tape is approximately devoid of compounds restricted under the REACH regulation. For reduction of the environmental impact, the pressure-sensitive adhesive tape according to the embodiment of the present invention has a total content of bis(2-ethylhexyl)phthalate (DOP) and dibutyl phthalate (DBP) of typically preferably 5000 ppm or less, and more preferably 3000 ppm or less, based on the total weight (100 percent by weight) of the pressure-sensitive adhesive tape. In particular, the total content is desirably controlled to less than 1000 ppm in countries under the REACH regulation. Particularly preferably, the pressure-sensitive adhesive tape according to the embodiment of the present invention is devoid of DOP and DBP.

The pressure-sensitive adhesive tape according to the embodiment of the present invention may be produced typically, but not limitatively, by applying the pressure-sensitive adhesive to the poly(vinyl chloride) substrate and drying the applied adhesive; by forming the backing-agent layer on or over one side of the poly(vinyl chloride) substrate, applying the pressure-sensitive adhesive to the other side of the substrate, and drying the applied adhesive; by applying the pressure-sensitive adhesive onto the separator, drying the applied adhesive, and laminating the resulting article with the poly(vinyl chloride) substrate; or by applying the pressure-sensitive adhesive onto the separator, drying the applied adhesive, separately forming the backing-agent layer on one side of the poly(vinyl chloride) substrate, and laminating the pressure-sensitive adhesive (layer) onto the other side of the substrate.

The pressure-sensitive adhesive tape may have a thickness not critical, but typically preferably from 40 to 200 μm, more preferably from 40 to 150 μm, and furthermore preferably from 50 to 150 μm. This is preferred because the resulting pressure-sensitive adhesive tape can be handled satisfactorily and can follow deformation typically upon drawing.

The pressure-sensitive adhesive tape according to the embodiment of the present invention may have an unwinding force at a tensile speed of 0.3 m/min not critical, but typically preferably 0.4 N/20 mm or less, more preferably 0.35 N/20 mm or less, and furthermore preferably 0.32 N/20 mm or less. The lower limit of the unwinding force at a tensile speed of 0.3 m/min is not critical, but typically preferably 0.01 N/20 mm. The pressure-sensitive adhesive tape, when having an unwinding force within the range at a tensile speed of 0.3 m/min, can be fed from the roll and can be laminated onto an adherend each at a low speed with good workability.

The term "unwinding force" refers to a value as measured in conformity to JIS Z 0237:2000.

The pressure-sensitive adhesive tape according to the embodiment of the present invention may have an unwinding force at a tensile speed of 30 m/min not critical, but typically preferably 1.2 N/20 mm or less, more preferably 1.1 N/20 mm or less, and furthermore preferably 1.0 N/20 mm or less. The lower limit of the unwinding force at a tensile speed of 30 m/min is not critical, but typically preferably 0.01 N/20 mm. The pressure-sensitive adhesive tape, when having an unwinding force within the range at a tensile speed of 30 m/min, can be fed from the roll and can be laminated onto an adherend each at a high speed with good workability.

The term "unwinding force" refers to a value as measured in conformity to JIS Z 0237:2000. More specifically, the unwinding force may be measured typically by a testing performed in "(2) unwinding force" in after-mentioned evaluations.

In particular, the pressure-sensitive adhesive tape according to the embodiment of the present invention preferably has an unwinding force of 0.4 N/20 mm or less at a tensile speed of 0.3 m/min and an unwinding force of 1.2 N/20 mm or less at a tensile speed of 30 m/min. In this case, the pressure-sensitive adhesive tape can be fed from the roll and can be laminated onto an adherend each with still better workability.

The pressure-sensitive adhesive tape according to the embodiment of the present invention may have an adhesive strength not critical, but typically preferably from 0.10 to 2.50 N/20 mm, and more preferably from 0.10 to 2.00 N/20 mm, where the adhesive strength is measured to a steel-use stainless (SUS) 430BA plate at a peel rate of 0.3 m/min. The pressure-sensitive adhesive tape according to the embodiment of the present invention may have an adhesive strength not critical, but typically preferably from 0.10 to 15.00 N/20 mm, and more preferably from 0.10 to 12.50 N/20 mm, where the adhesive strength is measured to a SUS 430BA plate at a peel rate of 30 m/min. The pressure-sensitive adhesive tape, when having adhesive strengths within the ranges, may exhibit excellent tackiness and removability. In particular, the pressure-sensitive adhesive tape according to the embodiment of the present invention preferably has an adhesive strength of from 0.10 to 2.00 N/20 mm to a SUS 430BA plate at a peel rate of 0.3 m/min and an adhesive strength of from 0.10 to 12.50 N/20 mm to a SUS 430BA plate at a peel rate of 30 m/min.

The "adhesive strength to a SUS 430BA plate" refers to a value as measured by a testing according to the method described in "(1) adhesive strength to a SUS 430BA plate" in after-mentioned evaluations.

The pressure-sensitive adhesive tape according to the embodiment of the present invention may be a pressure-sensitive adhesive tape roll that structurally includes the pressure-sensitive adhesive tape wound as a roll. The pressure-sensitive adhesive tape roll is exemplified by rolls respectively including the pressure-sensitive adhesive tapes wound as a roll, where the pressure-sensitive adhesive tapes are exemplified by one including the backing-agent layer, the PVC substrate, and the pressure-sensitive adhesive layer disposed in this order; and one including the backing-agent layer, the PVC substrate, the pressure-sensitive adhesive layer, and the separator disposed in this order. The roll may be a core-less pressure-sensitive adhesive tape roll including the pressure-sensitive adhesive tape alone wound as a roll; or a pressure-sensitive adhesive tape roll including a core and the pressure-sensitive adhesive tape wound around the core to form a roll.

The core is exemplified by, but not limited to, plastic cores each including a plastic material as a principal component; paper cores each including a paper material as a principal component; and metal cores each including a metal material as a principal component. Among them, plastic cores are preferred. The plastic material as a principal component in the plastic cores is exemplified by polyesters such as poly(ethylene terephthalate)s, poly(ethylene naphthalate)s, poly(butylene terephthalate)s, and poly(butylene naphthalate)s; polyolefins such as polyethylenes, polypropylenes, and ethylene-propylene copolymers; poly(vinyl alcohol)s; poly(vinylidene chloride)s; poly(vinyl chloride)s; vinyl chloride-vinyl acetate copolymers; poly(vinyl acetate)s; polyamides; polyimides; celluloses; fluorocarbon resins; polyethers; styrenic resins such as polystyrenes; polycarbonates; polyethersulfones; ABS (acrylonitrile-butadiene-styrene copolymers); and so-called "fiber-reinforced plastics (FRPs)". The core such as a plastic core may also be one further including an elastic layer on its surface so as to protect the pressure-sensitive adhesive tape from damage. The elastic layer is exemplified by a rubber layer as an elastic layer including a rubber component; and an elastomer layer as an elastic layer including an elastomer component.

The core may have a diameter (core diameter, core outer diameter) not critical, but typically preferably from 20 to 500 mm.

The pressure-sensitive adhesive tape roll can be stored even in a small area and can be transported easily. The pressure-sensitive adhesive tape according to the embodiment of the present invention can be easily unwound from the roll because of its excellent unwindability.

The pressure-sensitive adhesive tape according to the embodiment of the present invention is usable typically as surface-protective pressure-sensitive adhesive tapes. Specifically, the pressure-sensitive adhesive tape is usable typically as protective films for use in processing of plates or sheets of metals such as stainless steel and aluminum; pressure-sensitive adhesive tapes for use in dicing process; and surface-protective films typically for glass.

EXAMPLES

The present invention will be illustrated in further detail with reference to several examples and comparative examples below. It should be noted, however, that these are by no means intended to limit the scope of the present invention.

Production Example 1

Production of Poly(Vinyl Chloride) Substrate A

A poly(vinyl chloride) substrate A was produced as a soft poly(vinyl chloride) film by calendering. The poly(vinyl chloride) substrate A included a poly(vinyl chloride) having a degree of polymerization P of 1050 and a DOTP plasticizer (bis(2-ethylhexyl)terephthalate, supplied by J-PLUS Co., Ltd.) in a content of 20 percent by weight based on the total amount of the poly(vinyl chloride) substrate A. The poly(vinyl chloride) substrate A had a thickness of 70 μm.

Production Example 2

Production of Poly(Vinyl Chloride) Substrate B

A poly(vinyl chloride) substrate B was produced as a soft poly(vinyl chloride) film by calendering. The poly(vinyl chloride) substrate B included a poly(vinyl chloride) having a degree of polymerization P of 1050 and a DOTP plasticizer (bis(2-ethylhexyl)terephthalate, supplied by J-PLUS Co., Ltd.) in a content of 10 percent by weight based on the total amount of the poly(vinyl chloride) substrate B. The poly(vinyl chloride) substrate B had a thickness of 70 μm.

Production Example 3

Production of Poly(Vinyl Chloride) Substrate C

A poly(vinyl chloride) substrate C was produced as a soft poly(vinyl chloride) film by calendering. The poly(vinyl chloride) substrate C included a poly(vinyl chloride) having a degree of polymerization P of 1050 and a DOTP plasticizer (bis(2-ethylhexyl)terephthalate, supplied by J-PLUS Co., Ltd.) in a content of 35 percent by weight based on the total amount of the poly(vinyl chloride) substrate C. The poly(vinyl chloride) substrate C had a thickness of 70 μm.

Example 1

In a solution state, 60 parts by weight of a silicone resin (trade name KS-723A, supplied by Shin-Etsu Chemical Co., Ltd.), 40 parts by weight of a silicone resin (trade name KS-723B, supplied by Shin-Etsu Chemical Co., Ltd.), 50 parts by weight of a (meth)acrylic polymer, and 10 parts by weight of a tin catalyst (trade name Cat-PS3, supplied by Shin-Etsu Chemical Co., Ltd.) were mixed and yielded a solution mixture (1). The (meth)acrylic polymer was derived from methyl methacrylate (MMA), butyl acrylate (BA), and 2-hydroxyethyl acrylate (HEA) in proportions of 70:30:10. The solution mixture (1) had a ratio (by weight) of the silicone resin to the (meth)acrylic polymer of 2:1.

The solution mixture (1) was applied to one side of the poly(vinyl chloride) substrate A prepared in Production Example 1 to form a backing-agent layer having a thickness of 1.0 μm and an arithmetic mean surface roughness Ra of 0.5 μm.

Next, a pressure-sensitive adhesive solution as a solution of a pressure-sensitive adhesive in toluene was prepared. The pressure-sensitive adhesive included 100 parts by weight of an acrylic polymer, 10 parts by weight of a melamine crosslinking agent (butanol-modified melamine-formaldehyde resin, trade name DIC Resin BKA Super (Super Beckamine) J-820-60, supplied by DIC Corporation), and 60 parts by weight of a DOTP plasticizer (bis(2-ethylhexyl)terephthalate, supplied by J-PLUS Co., Ltd.). The acrylic polymer was derived from butyl acrylate (BA), acrylonitrile (AN), and acrylic acid (AA) in proportions of 85:15:2.5 (by weight) and had a solubility parameter of 9.3 $(cal/cm^3)^{0.5}$. The pressure-sensitive adhesive solution was applied to the other side of the poly(vinyl chloride) substrate A opposite to the backing-agent layer, dried at 130° C. for 90 seconds to form a pressure-sensitive adhesive layer having a thickness of 10 μm, and yielded a pressure-sensitive adhesive tape.

Example 2

A pressure-sensitive adhesive tape was prepared by the procedure of Example 1, except for using the poly(vinyl chloride) substrate B prepared in Production Example 2.

Example 3

A pressure-sensitive adhesive tape was prepared by the procedure of Example 1, except for using the poly(vinyl chloride) substrate C prepared in Production Example 3.

Example 4

The solution mixture as in Example 1 (the solution mixture (1)) was applied to one side of the poly(vinyl chloride) substrate A prepared in Production Example 1 to form a backing-agent layer having a thickness of 1.0 μm and an arithmetic mean surface roughness Ra of 0.5 μm.

Next, a pressure-sensitive adhesive solution was prepared as a solution of a pressure-sensitive adhesive in toluene. The pressure-sensitive adhesive included 100 parts by weight of an acrylic polymer, 10 parts by weight of a melamine crosslinking agent (butanol-modified melamine-formaldehyde resin, trade name DIC Resin BKA Super (Super Beckamine) J-820-60, supplied by DIC Corporation), and 60 parts by weight of a DOTP plasticizer (bis(2-ethylhexyl) terephthalate, supplied by J-PLUS Co., Ltd.). The acrylic polymer was derived from butyl acrylate (BA), acrylonitrile (AN), acrylic acid (AA), and 2-hydroxyethyl acrylate in proportions of 92:5:2:0.3 (by weight) and had a solubility parameter of 9.1 $(cal/cm^3)^{0.5}$. The pressure-sensitive adhesive solution was applied to the other side of the poly(vinyl chloride) substrate A opposite to the backing-agent layer, dried at 130° C. for 90 seconds to form a pressure-sensitive adhesive layer having a thickness of 10 μm, and yielded a pressure-sensitive adhesive tape.

Example 5

In a solution state, 20 parts by weight of a long-chain alkyl release agent (trade name PEELOIL 1010, supplied by Ipposha Oil Industries, Co., Ltd.) and 100 parts by weight of an ethylene-vinyl acetate copolymer (trade name EVAFLEX EV-150, supplied by DUPONT-MITSUI POLYCHEMICALS CO., LTD.) were mixed and yielded a solution mixture (2). The solution mixture (2) had a ratio (by weight) of the long-chain alkyl release agent to the ethylene-vinyl acetate copolymer of 1:5.

The solution mixture (2) was applied to one side of the poly(vinyl chloride) substrate A prepared in Production Example 1 to form a backing-agent layer having a thickness of 1.0 μm and an arithmetic mean surface roughness Ra of 0.5 μm.

Next, a pressure-sensitive adhesive solution was prepared as a solution of a pressure-sensitive adhesive in toluene. The pressure-sensitive adhesive included 100 parts by weight of an acrylic polymer, 10 parts by weight of a melamine crosslinking agent (butanol-modified melamine-formaldehyde resin, trade name DIC Resin BKA Super (Super Beckamine) J-820-60, supplied by DIC Corporation), and 60 parts by weight of a DOTP plasticizer (bis(2-ethylhexyl) terephthalate, supplied by J-PLUS Co., Ltd.). The acrylic polymer was derived from butyl acrylate (BA), acrylonitrile (AN), and acrylic acid (AA) in proportions of 85:15:2.5 (by weight) and had a solubility parameter of 9.3 $(cal/cm^3)^{0.5}$. The pressure-sensitive adhesive solution was applied to the other side of the poly(vinyl chloride) substrate A opposite to the backing-agent layer, dried at 130° C. for 90 seconds to form a pressure-sensitive adhesive layer having a thickness of 10 μm, and yielded a pressure-sensitive adhesive tape.

Example 6

The solution mixture as in Example 1 (the solution mixture (1)) was applied to one side of the poly(vinyl chloride) substrate A prepared in Production Example 1 to form a backing-agent layer having a thickness of 1.0 μm and an arithmetic mean surface roughness Ra of 0.5 μm.

Next, a pressure-sensitive adhesive solution was prepared as a solution of a pressure-sensitive adhesive in toluene. The pressure-sensitive adhesive included 100 parts by weight of an acrylic polymer, 10 parts by weight of a melamine crosslinking agent (butanol-modified melamine-formaldehyde resin, trade name DIC Resin BKA Super (Super Beckamine) J-820-60, supplied by DIC Corporation), and 60 parts by weight of a DOTP plasticizer (bis(2-ethylhexyl) terephthalate, supplied by J-PLUS Co., Ltd.). The acrylic polymer was derived from butyl acrylate (BA), acrylonitrile (AN), and acrylic acid (AA) in proportions of 70:30:2.5 (by weight) and had a solubility parameter of 9.7 $(cal/cm^3)^{0.5}$. The pressure-sensitive adhesive solution was applied to the other side of the poly(vinyl chloride) substrate A opposite to the backing-agent layer, dried at 130° C. for 90 seconds to form a pressure-sensitive adhesive layer having a thickness of 10 μm, and yielded a pressure-sensitive adhesive tape.

Example 7

The solution mixture as in Example 1 (the solution mixture (1)) was applied to one side of the poly(vinyl chloride) substrate A prepared in Production Example 1 to form a backing-agent layer having a thickness of 1.0 μm and an arithmetic mean surface roughness Ra of 0.5 μm.

Next, a pressure-sensitive adhesive solution was prepared as a solution of a pressure-sensitive adhesive in toluene. The pressure-sensitive adhesive included 100 parts by weight of a (meth)acrylic polymer, 5 parts by weight of an isocyanate crosslinking agent (trade name CORONATE L, supplied by Tosoh Corporation), and 60 parts by weight of a DOTP plasticizer (bis(2-ethylhexyl)terephthalate, supplied by J-PLUS Co., Ltd.). The (meth)acrylic polymer was derived from butyl acrylate (BA), methyl methacrylate (MMA), and 2-hydroxyethyl acrylate (HEA) in proportions of 64:33:3 (by weight) and had a solubility parameter of 9.0 $(cal/cm^3)^{0.5}$. The pressure-sensitive adhesive solution was applied to the other side of the poly(vinyl chloride) substrate A opposite to the backing-agent layer, dried at 130° C. for 90 seconds to form a pressure-sensitive adhesive layer having a thickness of 10 μm, and yielded a pressure-sensitive adhesive tape.

Example 8

The solution mixture as in Example 1 (the solution mixture (1)) was applied to one side of the poly(vinyl chloride) substrate A prepared in Production Example 1 to form a backing-agent layer having a thickness of 1.0 μm and an arithmetic mean surface roughness Ra of 0.5 μm.

Next, a pressure-sensitive adhesive solution was prepared as a solution of a pressure-sensitive adhesive in toluene. The pressure-sensitive adhesive included 100 parts by weight of an acrylic polymer, 1 part by weight of an epoxy crosslinking agent (trade name TETRAD C, supplied by MITSUBISHI GAS CHEMICAL COMPANY, INC.), and 60 parts by weight of a DOTP plasticizer (bis(2-ethylhexyl)terephthalate, supplied by J-PLUS Co., Ltd.). The acrylic polymer was derived from 2-ethylhexyl acrylate (2EHA), vinyl acetate (VAc), and acrylic acid (AA) in proportions of 100:80:5 (by weight) and had a solubility parameter of 8.8 $(cal/cm^3)^{0.5}$. The pressure-sensitive adhesive solution was applied to the other side of the poly(vinyl chloride) substrate A opposite to the backing-agent layer, dried at 130° C. for 90 seconds to form a pressure-sensitive adhesive layer having a thickness of 10 μm, and yielded a pressure-sensitive adhesive tape.

Example 9

The solution mixture as in Example 1 (the solution mixture (1)) was applied to one side of the poly(vinyl chloride) substrate A prepared in Production Example 1 to form a backing-agent layer having a thickness of 1.0 μm and an arithmetic mean surface roughness Ra of 0.5 μm.

Next, a pressure-sensitive adhesive solution was prepared as a solution of a pressure-sensitive adhesive in toluene. The pressure-sensitive adhesive included 100 parts by weight of a (meth)acrylic polymer, 3 parts by weight of an isocyanate crosslinking agent (trade name CORONATE L, supplied by Tosoh Corporation), 0.3 part by weight of a tin catalyst (trade name EMBILIZER OL-1, supplied by Tokyo Fine Chemical Co., Ltd.), and 20 parts by weight of a DOTP plasticizer (bis(2-ethylhexyl)terephthalate, supplied by J-PLUS Co., Ltd.). The (meth)acrylic polymer was derived from 2-ethylhexyl acrylate (2EHA), ethyl acrylate (EA), methyl methacrylate (MMA), and 2-hydroxyethyl acrylate (HEA) in proportions of 30:70:5:4 (by weight) and had a solubility parameter of 8.9 $(cal/cm^3)^{0.5}$. The pressure-sensitive adhesive solution was applied to the other side of the poly(vinyl chloride) substrate A opposite to the backing-agent layer, dried at 130° C. for 90 seconds to form a pressure-sensitive adhesive layer having a thickness of 10 μm, and yielded a pressure-sensitive adhesive tape.

Example 10

The solution mixture as in Example 1 (the solution mixture (1)) was applied to one side of the poly(vinyl chloride) substrate A prepared in Production Example 1 to form a backing-agent layer having a thickness of 1.0 μm and an arithmetic mean surface roughness Ra of 0.5 μm.

Next, a pressure-sensitive adhesive solution was prepared as a solution of a pressure-sensitive adhesive in toluene. The pressure-sensitive adhesive included 100 parts by weight of a (meth)acrylic polymer, 3 parts by weight of an isocyanate crosslinking agent (trade name CORONATE L, supplied by Tosoh Corporation), 0.3 part by weight of a tin catalyst (trade name EMBILIZER OL-1, supplied by Tokyo Fine Chemical Co., Ltd.), and 20 parts by weight of a DOTP plasticizer (bis(2-ethylhexyl)terephthalate, supplied by J-PLUS Co., Ltd.). The (meth)acrylic polymer was derived from 2-ethylhexyl acrylate (2EHA), ethyl acrylate (EA), methyl methacrylate (MMA), and 2-hydroxyethyl acrylate (HEA) in proportions of 15:85:7:2 (by weight) and had a solubility parameter of 8.9 $(cal/cm^3)^{0.5}$. The pressure-sensitive adhesive solution was applied to the other side of the poly(vinyl chloride) substrate A opposite to the backing-agent layer, dried at 130° C. for 90 seconds to form a pressure-sensitive adhesive layer having a thickness of 10 μm, and yielded a pressure-sensitive adhesive tape.

Example 11

The solution mixture as in Example 1 (the solution mixture (1)) was applied to one side of the poly(vinyl chloride) substrate A prepared in Production Example 1 to form a backing-agent layer having a thickness of 1.0 μm and an arithmetic mean surface roughness Ra of 0.5 μm.

Next, a pressure-sensitive adhesive solution was prepared as a solution of a pressure-sensitive adhesive in toluene. The pressure-sensitive adhesive included 100 parts by weight of a (meth)acrylic polymer, 3 parts by weight of an isocyanate crosslinking agent (trade name CORONATE L, supplied by Tosoh Corporation), 0.3 part by weight of a tin catalyst (trade name EMBILIZER OL-1, supplied by Tokyo Fine Chemical Co., Ltd.), and 20 parts by weight of a DOTP plasticizer (bis(2-ethylhexyl)terephthalate, supplied by J-PLUS Co., Ltd.). The (meth)acrylic polymer was derived from 2-ethylhexyl acrylate (2EHA), ethyl acrylate (EA), methyl methacrylate (MMA), and 2-hydroxyethyl acrylate (HEA) in proportions of 15:85:5:4 (by weight) and had a solubility parameter of 8.9 $(cal/cm^3)^{0.5}$. The pressure-sensitive adhesive solution was applied to the other side of the poly(vinyl chloride) substrate A opposite to the backing-agent layer, dried at 130° C. for 90 seconds to form a pressure-sensitive adhesive layer having a thickness of 10 μm, and yielded a pressure-sensitive adhesive tape.

Comparative Example 1

A substrate D was produced as a soft poly(vinyl chloride) film by calendering. The substrate D included a poly(vinyl chloride) having a degree of polymerization P of 1050 and a DOP plasticizer (bis(2-ethylhexyl)phthalate, supplied by J-PLUS Co., Ltd.) in a content of 20 percent by weight based on the total amount of the substrate. The substrate D had a thickness of 70 μm.

The solution mixture as in Example 1 (the solution mixture (1)) was applied to one side of the substrate D to form a backing-agent layer having a thickness of 1.0 μm and an arithmetic mean surface roughness Ra of 0.5 μm.

Next, a pressure-sensitive adhesive solution was prepared as a solution of a pressure-sensitive adhesive in toluene. The pressure-sensitive adhesive included 100 parts by weight of an acrylic polymer, 10 parts by weight of a melamine crosslinking agent (butanol-modified melamine-formaldehyde resin, trade name DIC Resin BKA Super (Super Beckamine) J-820-60, supplied by DIC Corporation), and 60 parts by weight of DOP plasticizer (bis(2-ethylhexyl)phthalate, supplied by J-PLUS Co., Ltd.). The acrylic polymer was derived from butyl acrylate (BA), acrylonitrile (AN), and acrylic acid (AA) in proportions of 85:15:2.5 (by weight). The pressure-sensitive adhesive solution was applied to the other side of the substrate D opposite to the backing-agent layer, dried at 130° C. for 90 seconds to form a pressure-sensitive adhesive layer having a thickness of 10 μm, and yielded a pressure-sensitive adhesive tape.

Comparative Example 2

A substrate E was produced as a soft poly(vinyl chloride) film by calendering. The substrate E included a poly(vinyl chloride) having a degree of polymerization P of 1050 and a low-molecular adipic acid polyester plasticizer (trade name ADK CIZER PN-7160, supplied by ADEKA CORPORATION) in a content of 20 percent by weight based on the total amount of the substrate. The substrate E had a thickness of 70 μm.

The solution mixture as in Example 1 (the solution mixture (1)) was applied to one side of the substrate E to form a backing-agent layer having a thickness of 1.0 μm and an arithmetic mean surface roughness Ra of 0.5 μm.

Next, a pressure-sensitive adhesive solution was prepared as a solution of a pressure-sensitive adhesive in toluene. The pressure-sensitive adhesive included 100 parts by weight of an acrylic polymer, 10 parts by weight of a melamine crosslinking agent (butanol-modified melamine-formaldehyde resin, trade name DIC Resin BKA Super (Super Beckamine) J-820-60, supplied by DIC Corporation), and 60 parts by weight of a low-molecular adipic acid polyester plasticizer (trade name ADK CIZER PN-7160, supplied by ADEKA CORPORATION, having a weight-average molecular weight (Mw) of 1600). The acrylic polymer was derived from butyl acrylate (BA), acrylonitrile (AN), and acrylic acid (AA) in proportions of 85:15:2.5 (by weight). The pressure-sensitive adhesive solution was applied to the other side of the substrate E opposite to the backing-agent layer, dried at 130° C. for 90 seconds to form a pressure-sensitive adhesive layer having a thickness of 10 μm, and yielded a pressure-sensitive adhesive tape.

Comparative Example 3

The solution mixture as in Example 1 (the solution mixture (1)) was applied to one side of the substrate D prepared in Comparative Example 1 to form a backing-agent layer having a thickness of 1.0 μm and an arithmetic mean surface roughness Ra of 0.5 μm.

Next, a pressure-sensitive adhesive solution was prepared as a solution of a pressure-sensitive adhesive in toluene. The pressure-sensitive adhesive included 100 parts by weight of an acrylic polymer, 10 parts by weight of a melamine crosslinking agent (butanol-modified melamine-formaldehyde resin, trade name DIC Resin BKA Super (Super Beckamine) J-820-60, supplied by DIC Corporation), and 60 parts by weight of DOP plasticizer (bis(2-ethylhexyl)phthalate supplied by J-PLUS Co., Ltd.). The acrylic polymer was derived from butyl acrylate (BA), acrylonitrile (AN), acrylic acid (AA), and 2-hydroxyethyl acrylate in proportions of 92:5:2:0.3 (by weight) and had a solubility parameter of 9.1 $(cal/cm^3)^{0.5}$. The pressure-sensitive adhesive solution was applied to the other side of the substrate D opposite to the backing-agent layer, dried at 130° C. for 90 seconds to form a pressure-sensitive adhesive layer having a thickness of 10 μm, and yielded a pressure-sensitive adhesive tape.

Comparative Example 4

A substrate F was produced as a soft poly(vinyl chloride) film by calendering. The substrate F included a poly(vinyl chloride) having a degree of polymerization P of 1050 and a DOTP plasticizer (bis(2-ethylhexyl)terephthalate, supplied by J-PLUS Co., Ltd.) in a content of 5 percent by weight based on the total amount of the substrate. The substrate F had a thickness of 70 μm.

The solution mixture as in Example 1 (the solution mixture (1)) was applied to one side of the substrate F to form a backing-agent layer having a thickness of 1.0 μm and an arithmetic mean surface roughness Ra of 0.5 μm.

Next, a pressure-sensitive adhesive solution was prepared as a solution of a pressure-sensitive adhesive in toluene. The pressure-sensitive adhesive included 100 parts by weight of an acrylic polymer, 10 parts by weight of a melamine crosslinking agent (butanol-modified melamine-formaldehyde resin, trade name DIC Resin BKA Super (Super Beckamine) J-820-60, supplied by DIC Corporation), and 60 parts by weight of a DOTP plasticizer (bis(2-ethylhexyl) terephthalate, supplied by J-PLUS Co., Ltd.). The acrylic polymer was derived from butyl acrylate (BA), acrylonitrile (AN), and acrylic acid (AA) in proportions of 85:15:2.5 (by weight). The pressure-sensitive adhesive solution was applied to the other side of the substrate F opposite to the backing-agent layer, dried at 130° C. for 90 seconds to form a pressure-sensitive adhesive layer having a thickness of 10 μm, and yielded a pressure-sensitive adhesive tape.

Evaluations

The pressure-sensitive adhesive tapes prepared in the examples and comparative examples were evaluated by measurement methods or evaluation methods as follows.

The results of evaluations are indicated in Table 1.

(1) Adhesive Strength to SUS 430BA Plate

Each of the pressure-sensitive adhesive tapes prepared in the examples and comparative examples was cut to a length of 100 mm and a width of 20 mm, laminated onto a SUS 430BA plate by compression bonding at a pressure of 0.25 MPa and a rate of 0.3 m/min, and yielded an evaluation sample.

The evaluation sample was left stand at room temperature (23° C.) for 30 minutes and subjected to peeling at a tensile speed of 0.3 m/min or 30 m/min and a peel angle of 180° using a universal tensile tester to measure an adhesive strength. The measurement was performed at an ambient temperature of 23° C. and relative humidity of 50%.

(2) Unwinding Force

The unwinding force was measured in conformity to JIS Z 0237:2000.

Specifically, each of the pressure-sensitive adhesive tapes prepared in the examples and comparative examples was cut to a length of 100 m and a width of 20 mm, wound around a core (having a core diameter of 7.6 cm) as a roll, and the resulting pressure-sensitive adhesive tape roll was left stand at an ambient temperature of 23° C. and relative humidity of 50% for 2 hours. Next, the pressure-sensitive adhesive tape roll was unwound at an ambient temperature of 23° C. and relative humidity of 50% and at a tensile speed of 0.3 m/min or 30 m/min using an unwinding force tester (supplied by TESTER SANGYO CO., LTD.) to measure force necessary for unwinding ("unwinding force at a tensile speed of 0.3 m/min" and "unwinding force at a tensile speed of 30 m/min").

(3) Environmental Burden Reduction

Each of the pressure-sensitive adhesive tapes prepared in the examples and comparative examples was analyzed by gas chromatography (GC) to measure the amount of a compound or compounds restricted under the REACH regulation in the pressure-sensitive adhesive tape, and based on this, the environmental burden reduction was evaluated.

For the GC analysis, about 0.1 g of each pressure-sensitive adhesive tape was sampled, placed in 10 ml of tetrahydrofuran (THF), shaken overnight, the resulting solution was injected into a GC analyzer and subjected to GC analysis under measurement conditions as follows:

Measurement Conditions
Analyzer 7890B (supplied by Agilent Technologies, Inc.)
Column HP-1 (30 m length by 0.25 mm inner diameter by 1.00 μm film thickness)
Column temperature: 100° C. for 1 min, raised at a rate of 20° C./min to 300° C., and held at 300° C. for 19 min
Column pressure: 81.6 kPa (steady-flow mode)
Carrier gas: He (1.0 ml/min)
Inlet: split (split ratio of 10:1)
Inlet temperature: 250° C.
Detector: flame ionization detector (FID)
Detector temperature: 250° C.

The environmental burden reduction was evaluated according to criteria as follows:

"Good": The sample pressure-sensitive adhesive tape had an amount of compounds restricted under the REACH regulation of less than 1000 ppm; and "Poor": The sample pressure-sensitive adhesive tape had an amount of compounds restricted under the REACH regulation of 1000 ppm or more.

[Table 1]

TABLE 1

|  |  | Ex. 1 | Ex. 2 | Ex. 3 | Ex. 4 | Ex. 5 | Ex. 6 | Ex. 7 | Ex. 8 | Ex. 9 | Ex. 10 | Ex. 11 | Com. Ex. 1 | Com. Ex. 2 | Com. Ex. 3 | Com. Ex. 4 |
|---|---|---|---|---|---|---|---|---|---|---|---|---|---|---|---|---|
| Adhesive strength to SUS 430BA plate [N/20 mm] | 0.3 m/min | 1.22 | 1.33 | 1.16 | 1.08 | 1.09 | 0.72 | 0.43 | 1.40 | 0.30 | 0.35 | 0.33 | 1.14 | 1.07 | 1.18 | 1.82 |
|  | 30 m/min | 4.90 | 5.10 | 4.90 | 9.80 | 4.80 | 3.10 | 1.28 | 5.80 | 1.50 | 1.86 | 1.74 | 7.80 | 6.00 | 10.20 | 8.60 |
| Unwinding force [N/20 mm] | 0.3 m/min | 0.23 | 0.18 | 0.31 | 0.20 | 0.40 | 0.21 | 0.10 | 0.31 | 0.15 | 0.16 | 0.14 | 0.25 | 0.52 | 0.23 | 0.51 |
|  | 30 m/min | 0.55 | 0.46 | 0.60 | 0.50 | 1.00 | 0.42 | 0.30 | 0.52 | 0.40 | 0.39 | 0.41 | 0.70 | 1.30 | 0.55 | 1.15 |
| Environmental burden reduction |  | Good | Good | Good | Good | Good | Good | Good | Good | Good | Good | Good | Poor | Good | Poor | Good |

The invention claimed is:

1. A pressure-sensitive adhesive tape comprising:
a poly(vinyl chloride) substrate comprising 10 to 40 percent by weight of bis(2-ethylhexyl) terephthalate;
a pressure-sensitive adhesive layer disposed on or over one side of the substrate; and
a backing-agent layer on or over the other side of the poly(vinyl chloride) substrate opposite to the pressure-sensitive adhesive layer,
wherein the pressure-sensitive adhesive tape has an unwinding force of 0.4 N/20 mm or less at a tensile speed of 0.3 m/min and an unwinding force of 1.2 N/20 mm or less at a tensile speed of 30 m/min, as measured in conformity to Japanese Industrial Standard (JIS) Z 0237:2000.

2. The pressure-sensitive adhesive tape according to claim 1, wherein the poly(vinyl chloride) substrate has a total content of bis(2-ethylhexyl) phthalate and dibutyl phthalate of 5000 ppm or less.

3. The pressure-sensitive adhesive tape according to claim 2, wherein the poly(vinyl chloride) substrate comprises 20 to 30 percent by weight of bis(2-ethylhexyl)terephthalate;
the pressure-sensitive adhesive layer comprises a (meth)acrylic pressure-sensitive adhesive comprising a (meth)acrylic polymer B having a solubility parameter (SP) of from 8.9 to 9.4 $(cal/cm^3)^{0.5}$ as determined by Small's formula as a base polymer;
a monomer component B constituting the (meth)acrylic polymer B includes at least one of methyl methacrylate, acrylic acid, vinyl acetate or acrylonitrile;
a total content of methyl methacrylate, acrylic acid, vinyl acetate and acrylonitrile is from 1 to 50 percent by weight based on 100 percent by weight of the monomer component B;
the backing-agent layer includes a release agent and a resin;
the release agent includes at least one of a silicone resin or a long-chain alkyl acrylate (co-)polymer, and the resin includes at least one of a (meth)acrylic polymer or an ethylene-vinyl acetate copolymer; and
the pressure-sensitive adhesive tape has an unwinding force of 0.32 N/20 mm or less at a tensile speed of 0.3 m/min and an unwinding force of 1.0 N/20 mm or less at a tensile speed of 30 m/min, as measured in conformity to Japanese Industrial Standard (JIS) Z 0237: 2000.

4. The pressure-sensitive adhesive tape according to claim 1, wherein the pressure-sensitive adhesive layer comprises a (meth)acrylic pressure-sensitive adhesive comprising, a (meth)acrylic polymer B as a base polymer, the (meth)acrylic polymer B having a solubility parameter (SP) of from 8.8 to 9.7 $(cal/cm^3)^{0.5}$ as determined by Small's formula.

5. The pressure-sensitive adhesive tape according to claim 4, wherein the (meth)acrylic polymer B comprises, as a monomer component, a monomer capable of forming a homopolymer having a glass transition temperature of 20° C. or higher.

6. The pressure-sensitive adhesive tape according to claim 4, wherein the (meth)acrylic polymer B in the pressure-sensitive adhesive layer has a solubility parameter (SP) of 8.9 to 9.4 $(cal/cm^3)^{0.5}$.

7. The pressure-sensitive adhesive tape according to claim 6, wherein the pressure-sensitive adhesive layer includes bis(2-ethylhexyl)terephthalate.

8. The pressure-sensitive adhesive tape according to claim 1, further comprising a separator on or over the pressure-sensitive adhesive layer.

9. The pressure-sensitive adhesive tape according to claim 1, wherein the pressure-sensitive adhesive layer includes bis(2-ethylhexyl)terephthalate.

10. The pressure-sensitive adhesive tape according to claim 9, wherein the backing-agent layer includes a release agent and a resin.

11. The pressure-sensitive adhesive tape according to claim 9, wherein the backing-agent layer includes a silicone resin and a (meth)acrylic polymer.

12. The pressure-sensitive adhesive tape according to claim 9, wherein the backing-agent layer includes an ethylene-vinyl acetate copolymer and a long-chain alkyl acrylate (co-)polymer.

13. The pressure-sensitive adhesive tape according to claim 9, wherein a weight ratio of the release agent to the resin is from 1:5 to 3:1.

14. The pressure-sensitive adhesive tape according to claim 9, wherein the backing-agent layer has an arithmetic mean surface roughness Ra of from 0.5 to 2.0 μm.

15. The pressure-sensitive adhesive tape according to claim 1, wherein the backing-agent layer includes a release agent and a resin.

16. The pressure-sensitive adhesive tape according to claim 1, wherein the backing-agent layer includes a silicone resin and a (meth)acrylic polymer.

17. The pressure-sensitive adhesive tape according to claim 1, wherein the backing-agent layer includes an ethylene-vinyl acetate copolymer and a long-chain alkyl acrylate (co-)polymer.

18. The pressure-sensitive adhesive tape according to claim 1, wherein a weight ratio of the release agent to the resin is from 1:5 to 3:1.

19. The pressure-sensitive adhesive tape according to claim 1, wherein the backing-agent layer has an arithmetic mean surface roughness Ra of from 0.5 to 2.0 μm.

20. A pressure-sensitive adhesive tape roll comprising the pressure-sensitive adhesive tape according to claim 1, the pressure-sensitive adhesive tape being wound as a roll.

* * * * *